United States Patent Office 3,822,228
Patented July 2, 1974

3,822,228
FLUOROCHEMICAL SURFACTANTS FOR LATEX PAINTS
Robert G. Petrella, Glenolden, and Michael Langsam, Allentown, Pa., assignors to Air Products and Chemicals Inc., Allentown, Pa.
No Drawing. Continuation-in-part of abandoned application Ser. No. 875,590, Nov. 10, 1969. This application Feb. 2, 1972, Ser. No. 222,976
Int. Cl. C08f 3/92, 15/36
U.S. Cl. 260—29.6 F
11 Claims

ABSTRACT OF THE DISCLOSURE

Improved stain and dirt release properties are obtained in latex paint compositions by incorporating therein a fluorochemical composition having highly desirable surface active properties. The salt derivatives of such fluorochemical compositions have been found to provide the most desirable paint compositions.

CROSS REFERENCE TO RELATED APPLICATIONS

This application is a continuation-in-part of application, Ser. No. 875,590, filed Nov. 10, 1969, now abandoned.

BACKGROUND OF THE INVENTION

It is well known in the art to use various paints to obtain protective and decorative coatings. More recently, latex paints have developed increased acceptability due to ease of application and other desirable properties. However, it has been found that the latex paint coatings show a tendency to retain stains and dirt thereby causing the coatings to become somewhat less attractive and more difficult to keep clean. Therefore, it would be highly desirable to provide a latex paint composition which would avoid the above problem.

SUMMARY OF THE INVENTION

In accordance with the present invention, fluorochemical compositions are provided in a fluorocarbon copolymer comprising at least one fluorocarbon acrylic monomer and an $\alpha,\beta$-ethylenically unsaturated carboxylic acid. The copolymer may be reacted with a nitrogen-containing salt forming agent to obtain water-soluble salt derivatives of the copolymer. The copolymers produced by emulsion techniques and the salt derivatives of either solution or emulsion copolymers have been found to be particularly useful in providing highly desirable finished surface properties for latex paint compositions.

PREFERRED EMBODIMENTS OF THE INVENTION

Both the fluorocarbon acrylic copolymers and salts thereof are suitable for use in a variety of latex paint compositions. Such paints include, for example, interior and exterior paints providing flat, semi-gloss and gloss finishes and are generally useful on substrates such as wood, metal, concrete, plastics and the like.

The fluorochemical compositions of the invention may be employed in various types of latex paints currently being used by the consumer. Such paints include those commonly known to or identifiable by the trade as containing vehicles such as 100% acrylics, vinyl-acrylic copolymers, vinyl chloride-acrylic copolymers, ethylene-vinyl acetate copolymers, vinyl acetate copolymers such as those containing dibutyl maleate, and styrene-butadiene latex copolymers. Such vehicles are generally dispersed in water, but are also suitably dispersed in various organic solvents such as polyhydric alcohols, ether alcohols, ester alcohols and the like.

The water soluble fluorochemical compositions of the present invention comprise copolymers consisting of (a) a fluorocarbon acrylic monomer of addition polymerized units from the structure:

$$R_fLZ$$

wherein $R_f$ is:

$$R_2(CF_2)_a—,$$

where $R_2$ is F or H and $a$ is an integer of from 1 to 20, $$(CF_3)_2CR_3(CF_2)_b—,$$

where $R_3$ is F or H and $b$ is 0 and $R_3$ is F when $b$ is an integer of from 1 to 18 or $$R_4(c—C_6F_{10})—,$$

where $R_4$ is F or $C_nF_{2n+1}$ and $n$ is an integer of from 1 to 4 and where $c—$ designates an alicyclic structure;

L is:

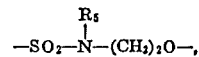

where $R_5$ is an alkyl group having from 1 to 10 carbon atoms, $$—(CH_2)_nO—,$$

where $n$ is a number from 0 to 2 or

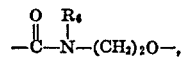

where $R_6$ is an alkyl group having from 1 to 10 carbon atoms;

Z is:

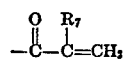

where $R_7$ is H or $CH_3$, and (b) a $\alpha,\beta$-ethylenically unsaturated carboxylic acid.

Specific examples of types of fluorocarbon acrylic monomers used in the present invention include:

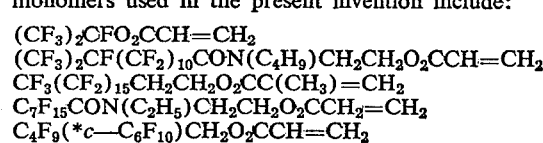

The above-described monomers are known compounds to persons of ordinary skill in the art and are well-documented in the literature. Copending patent application Ser. No. 608,510, now U.S. Pat. 3,600,433, illustrates perfluorocyclohexane esters of acrylic and methacrylic acids. Other patents, such as U.S. 3,304,278, teach the preparation of pentafluoroethyl carbinol acrylate and U.S. 2,642,416 show methods of making pentadecafluoro(n-heptyl) carbinol acrylate. Omega-hydroperfluorocarbinol acrylates are prepared according to methods shown in U.S. 2,559,629 and transesterified with methyl methacrylate as described in *Acrylic Resins*, by M. B. Horn, Reinhold Publishing Co. at page 18. Processes for making perfluoro alkyl-N-alkyl sulfonamido acrylates are shown in U.S. 2,803,615.

*c—designates an alicyclic structure.

The fluorocarbon acrylic monomers are reacted with an α,β-ethylenically unsaturated carboxylic acid to provide a fluorochemical containing copolymer. Such acids include both the mono- and dicarboxylic acids and include acrylic, methacrylic, itaconic, maleic, fumaric, crotonic acids and the like.

The foregoing copolymers may be produced in accordance with methods known to the art such as by solution polymerization and emulsion polymerization techniques using free radical initiators. Where solution polymerization techniques are employed, the monomers are dissolved in an organic solvent at a concentration of about 15% to about 70% by weight. A copolymerization temperature of between 25° C. and about 150° C. may be employed, the preferred range being between about 60° C. and about 120° C. Suitable catalysts such as the various peroxide or azo types may be employed as a copolymerization initiator at a concentration of from 0.1 to 4% by weight of the reaction mixture.

Emulsion polymerization is carried out in a manner such that the monomers to be copolymerized are emulsified in a water solution of surface-active agent to a given emulsion concentration of from about 5% to about 50%. Usually, the temperature is raised to between 30° C. and 90° C. to effect copolymerization in the presence of an added catalyst selected from various peroxide, persulfate or azo types. The concentration of the catalyst for the copolymerization is usually between 0.01% and 2% based on the weight of the monomers. Anionic, cationic or non-ionic emulsifying agents can be employed as the surface-active agent to stabilize the emulsion during its make-up and copolymerization, but a surface-active agent of the cationic or non-ionic type is preferred.

The copolymer should contain a ratio of fluorocarbon acrylic monomer to α,β-ethylenically unsaturated carboxylic acid in the range of from about 99:1 to about 50:50 by weight and preferably from about 95:5 to about 75:25 by weight.

The copolymers prepared in accordance with either of the solution or emulsion polymerization procedures described above may be reacted with a nitrogen-containing salt forming reagent to provide water-soluble salt derivatives of the invention. The salt derivatives are either primary, secondary or tertiary amines, which are inclusive only by way of example of both inorganic and organic amines, such as alkyl substituted amines, alkanolamines, nitrogen containing heterocyclics, cyclic amines, polyamines, ammonium hydroxide, and the like. Substituted amines may have one, two or all three of their hydrogens replaced with alkyl groups having 1 to 6 carbon atoms. The alkyls may be straight chain or isomeric like methylamine, ethylamine, diethylamine, triethylamine, tripropylamine, diisobutylamine. Alkyl substituted amines also encompass mixed amines such as N-ethyl-dipropylamine, N - ethyl - N - methyl propylamine, N,N-dimethyl butylamine, etc. Alkanolamines which form salts with the taught copolymers usually have 1 to 3 hydroxyl groups and may also be primary, secondary or tertiary amines. Examples of suitable alkanolamines are ethanolamine and pentanolamine and related compounds having 2 and 3 hydroxy groups and in the range of 2 to 10 carbon atoms. Nitrogen-containing heterocycles are *inter alia* both aromatic and non-aromatic types which may or may not be substituted, like imidazole, morpholine, piperidine and alkyl substituted heterocycles having 1 to 6 carbon atoms such as 2-ethyl imidazole. Cyclic amines and especially dicyclic compounds like triethylenediamine are useful salt forming agents. Examples of suitable polyamines are methanediamine, 1, 2 propanidamine, diethylene triamine, etc.

The nitrogen containing salt forming agent is present in an amount from 0.5 to about 1.25 times the stoichiometric amount required to neutralize the acid portion of the polymer.

It is to be understood that, although the salt derivatives of both the above-described emulsion and solution copolymers may be employed in latex paints, the emulsion or latex copolymers alone may also be incorporated in to the paints to also obtain desirable properties. However, it is preferred that the salt derivatives be employed to obtain the most desirable results.

Paint compositions are generally prepared by methods known in the art. For example, interior flat paint, is prepared by (1) mixing together measured amounts of water, dispersing agent, thickening agent and wetting agent, and mixing the resulting mixture together with an appropriate mixture (2) containing antifoam agent, coalescent agent, wet edge agent and a bacteriostat. Generally the mixture of (2) is slowly added to the mixture of (1) with stirring. To the admixture of (1) and (2) is added a third mixture containing a primary pigment (e.g. $TiO_2$), clay extender and a dry hiding or flatting agent such as $SiO_2$. The resulting mixture is subjected to high shear mixing for about 15 minutes and subsequently to a lower mixing speed during which time additional amounts of thickener and anti-foam agent is added. Also during the period of low speed mixing is added the appropriate latex base or vehicle. Additional water may be added if needed and, where pH control is necessary, an appropriate base such as ammonia may be employed.

The latex copolymers and salt derivatives of the copolymers, as hereinbefore described, are preferably added to a latex paint mixture as part of the dispersing agent as set forth in step (1) above. However it is to be understood that the latex copolymers may also be added after the paint mixture has been completely formulated. It has been found that desirable paint compositions are obtained when the latex copolymer or salt derivatives of the copolymers are present in amount of from about 0.1 percent to about 1.2 percent by weight based on the total solids content of the paint system.

The particular copolymers and salt derivatives of the invention, when added to latex paint compositions, have been found to provide an improved, attractive and durable finished surface. To prevent accumulation of dirt and stains on presently known latex paint surfaces, various methods and formulations have been developed such as formulations that provide self-powdering surfaces subsequent applications to the finish of clear lacquers and/or glazes, etc. The present invention obviates the necessity for such practices.

The following examples are illustrative of the present invention and are not intended to limit the scope thereof.

EXAMPLE 1

An undecafluorocylohexane carbinol acrylate and methacrylic acid copolymer was prepared as follows:

In a 250 ml. 3-necked round bottomed flask equipped with a stirring rotor, dropping funnel and reflux condenser was charged 100 ml. of 1,4-dioxane. The dioxane was heated to reflux and from the dropping funnel was added—dropwise over 2 hours a mixture of Undecafluorocyclohexane carbinol acrylate _____ g__ 40
Methacrylic acid _____ g__ 10
$nC_{12}H_{25}SH$ (n-dodecylmercaptan) _____ ml__ 2
Di-t-butyl peroxide _____ ml__ 3

After the addition was complete the mixture was refluxed for an additional 3 hours. The product was then cooled to room temperature and the polymer recovered.

EXAMPLE 2

The procedures of Example 1 were substantially repeated except that 40 gms. of undecafluorocyclohexane carbinol methacrylate and 10 gms. of methacrylic acid were substituted.

EXAMPLE 3

In a stirred reactor equipped with a septum cap was placed

| | |
|---|---|
| Undecafluorocyclohexane Carbinol Acrylate ___g__ | 22.5 |
| Methacrylic Acid ___g__ | 2.5 |
| Tetrahydrofuran (THF) ___ml__ | 175 |
| $nC_{12}H_{25}SH$ ___ml__ | 1.5 |
| Benzoyl peroxide ___g__ | 0.5 |

The mixture was agitated at 70° C. for 6 hours. At 1½, 3 and 4½ hours a mixture of: benzoyl peroxide 0.5 g. and THF 5.0 ml. was injected into the reactor. At the end of six hours the reactor was cooled and the polymer recovered.

EXAMPLE 4

A mixture of the following was prepared.

| | |
|---|---|
| Undecafluorocyclohexane carbinol acrylate ___g__ | 45 |
| Methacrylic acid ___g__ | 5 |
| $nC_{12}H_{25}SH$ ___ml__ | 1.5 |

From this mixture, 15 g. were added to 125 ml. of water and 5 g. of 28% sodium lauryl sulfate solution in a 250 ml. 3-necked round bottom flask equipped with a stirring rotor, dropping funnel, thermometer, and reflux condenser. The mixture was stirred and purged with a stream of $N_2$ for 30 minutes. Then 0.25 g. $(NH_4)_2S_2O_8$ and 0.25 g. sodium bisulfate were added. This mixture—at 30° C.—was stirred and the remaining portion of the mixture (35 g.) was added over a period of 90 minutes and the temperature increased to 60° C. After all the mix had been added, the temperature was rapidly raised from 60° C. 90–92° C. and the temperature maintained for 30 minutes. The mixture was then cooled to room temperature and the polymer recovered.

EXAMPLE 5

To a 250 ml. 3-necked round bottom flask equipped with a stirring rotor, reflux condenser and dropping funnel was placed 100 g. of meta-xylene. The meta-xylene was heated to reflux and from a dropping funnel a mixture of

| | G. |
|---|---|
| Undecafluorocyclohexane carbinol acrylate | 25 |
| Acrylic acid | 25 |
| di-t-butyl peroxide | 3 |
| $nC_{12}H_{25}SH$ | 5 | was added with stirring over a period of 5 hours. The product was cooled to room temperature and the polymer recovered.

EXAMPLE 6

The procedures of Example 5 were substantially repeated except that the following mixture was substituted:

| | G. |
|---|---|
| Heptafluoro(n-propyl) carbinol acrylate | 40 |
| Methacrylic acid | 10 |

EXAMPLE 7

In a 250 ml. 3-necked round bottomed flask equipped with a stirring rotor, reflux condenser and a dropping funnel was placed 75 g. of meta-xylene. The meta-xylene was heated to reflux and from the dropping funnel a mixture of

| | G. |
|---|---|
| Undecafluorocyclohexane carbinol methacrylate | 45.0 |
| Methacrylic acid | 5.0 |
| $nC_{12}H_{25}SH$ | 4.0 |
| Di-t-butyl peroxide | 2.0 | was added dropwise to the refluxing xylene over a period of 2 hours. The refluxing was continued for an additional 3 hours. The polymer was cooled to 61° C. and 25 g. of absolute ethanol was added.

EXAMPLES 8-18

The procedure outlined in Example 1 was substantially repeated except that the following monomers were substituted

| Example No. | 8 | 9 | 10 | 11 | 12 | 13 | 14 | 15 | 16 | 17 | 18 |
|---|---|---|---|---|---|---|---|---|---|---|---|
| BA | 45 | | | | | | | | | | |
| OA | | 40 | 45 | | | | | | | | |
| CA | | | | 45.2 | | | | | | | |
| ωHC₅MA | | | | | 35 | 45 | | | | | |
| ωHC₁₁A | | | | | | | 45 | | | | |
| 6FKA | | | | | | | | 35 | 47.5 | | |
| PA | | | | | | | | | | 40 | |
| nBA | | | | | | | | | | | 40 |
| MAA | 5 | | 5 | 7.5 | | 5 | 5 | | 2.5 | 10 | 10 |
| AA | | 10 | | | 15 | | | 15 | | | |

Note:
 BA = Heptafluoro (n-propyl) carbinol acrylate.
 OA = Pentadecafluoro(n-heptyl) carbinol acrylate.
 CA = Undecafluorocyclohexane carbinol acrylate.
 ωHC₅MA = 5-hydrooctafluoro(n-butyl) carbinol acrylate.
 ωHC₁₁A = 11-hydroeicosafluoro(n-decyl) carbinol acrylate.
 6FKA = bis-(trifluoromethyl) carbinol acrylate.
 PA = Pentafluoroethyl carbinol acrylate.
 nBA = Perfluoro-4-(n-butyl)cyclohexane carbinol acrylate.
 MAA = Methacrylic acid.
 AA = Acrylic acid.

EXAMPLE 19

Following the procedures of Example 3, the reactor was charged with

| | |
|---|---|
| Heptafluoro(n-propyl carbinol acrylate ___g__ | 10 |
| Undecafluorocyclohexane carbinol acrylate ___g__ | 10 |
| Methacrylic acid ___g__ | 5 |
| $nC_{12}H_{25}SH$ ___ml__ | 1.5 |
| Benzoyl peroxide ___g__ | 0.5 |
| Tetrahydrofuran ___ml__ | 175 |

The mixture was agitated at 75° C. for 6 hours. At 1½, 3 and 4¼ hours, an additional increment of 0.5 g. of benzoyl peroxide was introduced. The reaction mixture was cooled and the polymer product recovered.

EXAMPLE 20

The procedures of Example 1 were substantially repeated except that 40 gms. of pentadecafluoroheptyl-N-ethyl-sulfonamido ethyl acrylate was substituted for the undecafluorocyclohexane carbinol acrylate.

EXAMPLE 21

The procedures of Example 1 were substantially repeated except that 40 gms. of undecafluorocyclohexane-(N-t-butyl)-carboxamido-N-(2-ethyl)acrylate and 10 gms. of acrylic acid were substituted for the undecafluorocyclohexane carbinol acrylate and methacrylic acid.

EXAMPLE 22

The procedures of Example 1 were substantially repeated except that 40 gms. of 1,1,2,2-tetrahydro-heptadecafluoro decyl methacrylate and 10 gms. of acrylic acid were substituted for the undecafluorocyclohexane carbinol acrylate and methacrylic acid.

Conversion of the copolymers, as described above, to the salt derivative is described in the following examples.

EXAMPLE 23

A sample of product prepared by the procedure described in Example 1 was dried, i.e., freed of solvent substantially completely, in a Büchi Rotavapor, a device designed for containment of sample material with rotation thereof under vacuum conditions to effect evaporative drying. The dried copolymer (2.8 g.), designated as being a copolymer of 80% (by weight) undecafluorocyclohexane carbinol acrylate and 20% (by weight) methacrylic acid was added to an aqueous solution of 2.0 g. of triethanolamine in 10 g. of demineralized water. With mild agitation, the reaction of the polymer and the amine to form the salt was complete to subsequently provide a stable solution.

EXAMPLE 24

A 6.0 g. sample of the dried copolymer of Example 23 was added to a solution of 2.2 g. of $NH_4OH$ (28%) in 20 g. of demineralized water. Salt formation was incomplete with this amount of available NH$_4$OH as shown by existence of a dispersion in the slightly colored solution. Upon addition of 3 g. of triethanolamine the reaction was complete as evidenced by a clear solution.

EXAMPLE 25

A sample of product prepared by the procedure described in Example 2 was dried as described in Example 23. A portion of the dried copolymer, designated as being a copolymer of 80% undecafluorocyclohexane carbinol methacrylate and 20% methacrylic acid, was used in an amount of 4.7 g. and added to an aqueous solution of 4.0 g. of triethanolamine in 10 g. of demineralized water. Mild agitation of the admixture was employed and reaction of the polymer and amine occurred readily with the formation of a water-white, stable solution of the copolymer salt.

EXAMPLE 26

An 8.0 g. sample of the dried copolymer of Example 25 was added to a solution of 4.0 g. of NH$_4$OH (28%) in 30 g. of demineralized water. The salt derivative of the copolymer was formed after the further addition of an aqueous solution of 4 g. of triethanolamine in 20 g. of demineralized water.

EXAMPLE 27

Product prepared as described in Example 19 was subjected to drying as described in Example 23. Of the dried product designated as the mixed copolymer composition of 40% heptafluoro(n-propyl) carbinol acrylate, 40% perfluorocyclohexylacrylate and 20% methacrylic acid, 4.1 g. was added to an aqueous solution of 4.0 g. of triethanolamine in 40 g. of demineralized water. Formation of the polymer salt occurred over a period of time with stirring.

EXAMPLE 28

A 20 g. sample of the dried copolymer as in Example 23 was placed in a Erlenmeyer flask with 30 g. of demineralized water. An aqueous solution of 6.0 g. of diisobutylamine in 20 g. of demineralized water was prepared and added to the flask. Upon stirring, the copolymer salt was formed as evidenced by a clear solution.

EXAMPLE 29

Three parts by weight of the dried copolymer as in Example 23 were placed in a flask with 12.2 parts by weight of demineralized water. To the flask was added 1.7 parts by weight of NH$_4$OH (28% concentration). The mixture was stirred until the copolymer salt formation was complete. The salt was water soluble.

EXAMPLE 30

Three parts by weight of the dried copolymer as prepared in Example 25 were placed in a flask with 12.0 parts by weight of water. The flask was added one part by weight of triethylamine. The mixture was stirred and the completely water soluble copolymer salt was formed.

EXAMPLE 31

A mixture of 6 parts by weight of the dried copolymer as prepared in Example 23, 20 parts by weight of demineralized water and 1.3 parts by weight of an aqueous solution of ethylamine (70%) was stirred in a flask until the copolymer salt formation was complete.

EXAMPLE 32

A mixture of 6 parts by weight of the dried copolymer as prepared in Example 25, 30 parts by weight of demineralized water and 1.3 parts by weight of an aqueous solution of ethylamine (70%) was prepared in a flask and stirred until the copolymer salt formation was complete.

EXAMPLE 33

A 30 g. sample of the dried copolymer as prepared in Example 23 was placed in a flask with 40.7 g. of demineralized water. To the flask was added an aqueous solution consisting of 4.1 g. of triethylenediamine and 13.0 g. of demineralized water was added. Analysis of the product showed that the copolymer salt formation was complete even though the final solution was slightly cloudy.

EXAMPLE 34

Twenty parts by weight of the copolymer of Example 1, dried as in Example 23 were placed in a container with 30 parts by weight of demineralized water. To this was added an aqueous solution consisting of 4.5 parts by weight of 2-ethylimidazole in 20 parts by weight of demineralized water. The mixture was stirred until the copolymer salt formation was complete and a clear solution was obtained.

EXAMPLE 35

The procedures of Example 34 were substantially repeated except that 3.2 parts by weight of imidazole was substituted for the 2-ethylimidazole. Salt formation was evidenced by a clear solution.

EXAMPLE 36

A mixture was prepared in a container of—

25 parts by weight of dried copolymer of Example 1,
100 parts by weight of demineralized water, and
5.7 parts by weight of morpholine.

The copolymer salt formed upon mild agitation and the final solution was clear and had a very light color.

EXAMPLE 37

The procedures of Example 36 were substantially repeated except that the dried copolymer of Example 2 was employed. Copolymer salt formation was evidenced by a light colored product.

EXAMPLE 38

A sample of copolymer prepared as in Example 9 and dried by the Rotavapor technique was used in an amount of 17.5 parts by weight and placed in a container with 40 parts by weight of demineralized water. To the container was added an aqueous solution consisting of 2.8 parts by weight of ethylamine solution (70% concentration in water) in 10 parts by weight of demineralized water. The admixture was stirred until the copolymer salt formation was complete and a clear solution obtained.

EXAMPLE 39

A sample of copolymer prepared as in Example 11 and dried by the Rotavapor technique was employed in an amount of 36 parts by weight and placed in a stirring kettle with 60 parts by weight of demineralized water. To the kettle was then added, with vigorous stirring, an aqueous solution of 4.0 parts by weight of ethylamine (70% in water) solution and 29.3 parts by weight of demineralized water. A subsequent addition was made of 0.5 part by weight of ethylamine solution (70% in water). Copolymer salt formation was complete after 8 hours of agitation and a clear product solution was produced.

EXAMPLE 40

A sample of copolymer prepared as in Example 5 and dried by the Rotavapor technique was used in an amount of 43.1 parts by weight and placed in a stirring kettle with 60 parts by weight demineralized water. To the kettle was added an aqueous solution consisting of 32 parts by weight of ethylamine solution (70% in water) and 27.3 parts by weight of demineralized water. Upon vigorous stirring, the copolymer salt formation was completed. The clear solution has an undesirably high viscosity and an additional 30 parts by weight of demineralized water were added with stirring. The final product was a clear solution.

EXAMPLE 41

A sample of copolymer prepared as in Example 3 and dried by the Rotavapor technique was employed in an amount of 45 parts by weight and placed in a stirring kettle with 35 parts by weight of demineralized water. To the kettle was added an aqueous solution consisting of 1 part by weight of ethylamine solution (70% in water) and 20 parts by weight of demineralized water. This admixture was stirred vigorously and copolymer salt formation was completed to provide a clear product solution.

EXAMPLE 42

A 10 g. sample of the copolymer prepared in Example 8 and dried by the Rotavapor technique was placed in an Erlenmeyer flask with 30 g. of demineralized water. To the flask was added an aqueous solution consisting of 1.5 g. of ethylamine solution (70% in water) and 10 g. of demineralized water. The mixture was stirred until the copolymer salt formation was complete and a clear solution was obtained.

EXAMPLE 43

Twenty parts by weight of the copolymer as produced in Example 20 and dried as in Example 23 were placed into a container with 30 parts by weight of demineralized water. To the container was added 3 parts by weight of an aqueous solution of 70% ethyl amine in 20 parts by weight of demineralized water. The mixture was stirred until the copolymer salt was formed and a clear solution obtained.

EXAMPLE 44

The procedures of Example 43 were substantially repeated except that 20 parts by weight of the copolymer as prepared in Example 21 were substituted for the copolymer of Example 20.

EXAMPLE 45

The procedures of Example 43 were susbtantially repeated except that 20 parts by weight of the copolymer as prepared in Example 22 were substituted for the copolymer of Example 20.

EXAMPLE 46

20 g. sample of the copolymer prepared in Example 13 and dried by the Rotavapor technique was placed in an Erlenmeyer flask with 30 g. of demineralized water. To the flask was added an aqueous solution consisting of 1.5 g. of ethylamine solution (70% in water) and 10 g. of demineralized water. The mixture was stirred until the copolymer salt formation was complete and a clear solution was obtained.

Many of the fluorochemical compositions of the invention were tested for effectiveness as surfactive additives to various commercial paint systems and included the latex paints—interior semi-gloss, exterior flat, interior flat, and very high quality interior flat. Tests were conducted wherein the fluorochemical compositions were added to the paint by "post addition," i.e. by adding the salt to the formulated paint by simple admixture, or by substituting part of the dispersing agent with the fluorochemical compositions prior to the high shear mixing stage. Generally, the modified paints were allowed to stand overnight before their application as coatings to test panels.

The test films were cast onto the panels using a 7 mil latex film applicator, i.e., a device designed to spread a uniform 7 mil film of paint on the test panels, and were air-dried a minimum of 4 days prior to testing. The stain removal tests were run on a Gardner Scrub Machine using a cellulose sponge and holder such that the total load on the panel was one pound. Lava soap was the standard scrub medium. Six stain agents were applied to the paint film one hour before starting the scrub test which is described in Federal Specification 141a-6141. The test stains were lipstick, a 6B lead pencil, china marking crayon, ball-point ink, olive oil and merthiolate. Results are shown at +, = and ⊖, meaning better, equal to or poorer than the results obtained on the control panel.

The oleophobicity test method involved placement of the coated panel on a level surface. A series of oil samples having differing surface tension values were available for test purposes and are listed as follows:

1. mineral oil
2. 65% mineral oil–35% hexadecane
3. hexadecane
4. dodecane
5. decane
6. nonane
7. octane
8. heptane The higher numbers shown in the test results indicate a higher oleophobic value for the paint surface. The oleophobic value was determined by applying a drop of oil to the painted surface, starting in each instance with the oil having the highest surface tension values and progressing with each successive numbered oil, until the surface tension of a particular oil sample was lower than the surface free energy of the paint film as shown by spreading of the oil across the paint film.

In the "shake and rinse test," a painted test panel was placed in a paper bag containing 50 g. of synthetic dirt. The bag was closed and the contents shaken vigorously for 30 seconds in a manner such that the dirt continuously struck the painted surface. The panel was then removed from the bag and rinsed for 5 seconds under running tap water, air dried and rated visually on the basis of relative appearance as compared with a control panel. The panels were given a rating based on a value of 10 for an appearance equivalent to that of the clean control panel to a value of 1 where the surface appeared dark brown. The synthetic dirt was composed of 38% peat moss, 17% portland cement, 17% kaolin clay, 17% silica, 1.75% furnace black, 0.5% red iron oxide and 8.75% mineral oil.

EXAMPLES 47–50

Fluorochemical compositions in acrylic latex flat wall paint

| | Control | 47 | 48 | 49 | 50 |
|---|---|---|---|---|---|
| Paint composition (all in parts by weight): | | | | | |
| Water | 78.4 | 78.4 | 78.4 | 78.4 | 78.4 |
| Primary dispersing agent | 6.0 | 6.0 | 6.0 | 3.6 | 2.4 |
| Wetting agent | 1.2 | 1.2 | 1.2 | 1.2 | 1.2 |
| Thickening agent | 163.5 | 163.5 | 163.5 | 163.5 | 163.5 |
| Anti-foam agent | 1.8 | 1.8 | 1.8 | 1.8 | 1.8 |
| Coalescing agent | 18.0 | 18.0 | 18.0 | 18.0 | 18.0 |
| Wet edge agent | 9.0 | 9.0 | 9.0 | 9.0 | 9.0 |
| Anti-mildew fungicide | 0.6 | 0.6 | 0.6 | 0.6 | 0.6 |
| $TiO_2$ | 108.0 | 108.0 | 108.0 | 108.0 | 108.0 |
| Natural $SiO_2$ | 31.5 | 31.5 | 31.5 | 31.5 | 31.5 |
| Calcined clay | 78.0 | 78.0 | 78.0 | 78.0 | 78.0 |
| Synthetic silica | 16.2 | 16.2 | 16.2 | 16.2 | 16.2 |
| 100% acrylic resin | 155.0 | 155.0 | 155.0 | 155.0 | 155.0 |
| $NH_4OH$ | 1.0 | 1.0 | 1.0 | 1.0 | 1.0 |
| Fluorochemical additive: | | | | | |
| Fluorochemical salt of Example 31, parts by weight of solids | | 3.0 | | | |
| Fluorochemical salt of Example 38, parts by weight of solids | | | 3.3 | 6.6 | 9.9 |
| Fluorochemical salt solids, percent of total weight | 0 | 0.3 | 0.3 | 0.6 | 0.9 |
| Viscosity, kreb units | 118 | 110 | 104 | 106 | 96 |

Stain removal tests△ (Gardner scrub machine—Lava soap—cellulose sponge)

| | Cycles | 47 | 48 | 49 | 50 |
|---|---|---|---|---|---|
| Lipstick | +2,000 | +2,000 | +2,000 | +2,000 | +2,000 |
| Permanent ink | +2,000 | +2,000 | +2,000 | +2,000 | +2,000 |
| Washable ink | +2,000 | +2,000 | +2,000 | +2,000 | +2,000 |
| Lemon juice | 432 | 60 | 130 | 350 | 135 |
| China marker | 864 | 175 | 640 | 645 | 1,025 |
| Ball point | +2,000 | +2,000 | +2,000 | +2,000 | +2,000 |
| Pencil | 170 | 30 | 97 | 300 | 1,130 |
| Olive oil [1] | 200 | 8 | 121 | 60 | 250 |

Compared to non-fluorochemical content

| Visual rating: | | | | | |
|---|---|---|---|---|---|
| Lipstick | Control | = | + | = | = |
| Permanent ink | Control | + | + | = | + |
| Washable ink | Control | + | + | + | + |
| Ball point | Control | + | + | + | + |
| Olive oil | Control | + | + | + | = |

[1] The oil stain disappeared during the scrub cycles but reappeared after standing.

Note.—△scrub test, "Washability of Paints Federal Specifications 141a-6141".

EXAMPLES 51-53

Fluorochemical compositions in latex flat wall paint

|  | Control | 51 | 52 | 53 |
|---|---|---|---|---|
| Paint formulation, parts by weight: |  |  |  |  |
| Water | 78.4 | 78.4 | 78.4 | 78.4 |
| Dispersing agent | 6.0 | 3.6 | 3.6 | 3.6 |
| Wetting agent | 1.2 | 1.2 | 1.2 | 1.2 |
| Cellulosic thickener | 163.5 | 163.5 | 163.5 | 163.5 |
| Anti-foam agent | 1.8 | 1.8 | 1.8 | 1.8 |
| Coalescing agent | 18.0 | 18.0 | 18.0 | 18.0 |
| Wet edge agent | 9.0 | 9.0 | 9.0 | 9.0 |
| Anti-mildew fungicide | 1.2 | 1.2 | 1.2 | 1.2 |
| $TiO_2$ | 108.0 | 108.0 | 108.0 | 108.0 |
| Natural $SiO_2$ | 31.5 | 31.5 | 31.5 | 31.5 |
| Calcined clay | 78.0 | 78.0 | 78.0 | 78.0 |
| Synthetic $SiO_2$ | 16.2 | 16.2 | 16.2 | 16.2 |
| 100% acrylic resin | 155.0 | 155.0 | 155.0 | 155.0 |
| $NH_4OH$ | 1.0 | 1.0 | 1.0 | 1.0 |
| Fluorochemical modifier: |  |  |  |  |
| Fluorochemical salt of Example 31, parts by weight of solids |  | 6.0 |  |  |
| Fluorochemical salt of Example 39, parts by weight of solids |  |  | 6.0 |  |
| Fluorochemical salt of Example 40, parts by weight of solids |  |  |  | 6.9 |
| Fluorochemical salt solids, percent of total weight | 0 | 0.6 | 0.6 | 0.6 |
| Viscosity, kreb units | 108 | 102 | 109 | 110 |

Stain removal tests (Gardner scrub machine—Lava soap—cellulose sponge)

| Cycles | 51 | 52 | 53 |
|---|---|---|---|
| Lipstick | +2,000 | +2,000 | +2,000 | +2,000 |
| Permanent ink | +2,000 | +2,000 | +2,000 | +2,000 |
| Washable ink | +2,000 | +2,000 | +2,000 | +2,000 |
| Lemon juice | 500 | 415 | 1,900 | 860 |
| China marker | 550 | 440 | 1,615 | 665 |
| Lead pencil | 545 | 1,950 | 1,425 | 410 |
| Ball point | +2,000 | +2,000 | +2,000 | +2,000 |
| Olive oil [1] | 195 | 115 | 20 | 25 |
| Visual rating against the control: |  |  |  |  |
| Lipstick | Control | + | + | θ |
| Permanent ink | Control | + | = | = |
| Washable ink | Control | + | + | = |
| Lemon juice | Control | θθ | = | = |
| China marker | Control | Control | Control | Control |
| Lead pencil | Control | Control | Control | Control |
| Ball point | Control | = | + | θ |
| Olive oil | Control | ++ | ++ | ++ |

[1] The surface oil disappears during the scrub cycles but resurfaces after standing over night.

EXAMPLE 54

Fluorochemical compositions in interior acrylic latex paint

|  | Control | 54 |
|---|---|---|
| Paint formulation, parts by weight: |  |  |
| Water | 78.1 | 78.1 |
| Dispersing agent | 6.0 | 4.8 |
| Wetting agent | 1.2 | 1.2 |
| Cellulosic thickener | 163.5 | 163.5 |
| Anti-foam agent | 1.8 | 1.8 |
| Coalescing agent | 18.0 | 18.0 |
| Wet edge agent | 9.0 | 9.0 |
| Anti-mildew fungicide | 0.6 | 0.6 |
| $TiO_2$ | 108.0 | 108.0 |
| Natural silica | 31.5 | 31.5 |
| Calcined clay | 78.0 | 78.0 |
| Synthetic silica | 16.2 | 16.2 |
| 100% acrylic resin | 155.0 | 155.0 |
| $NH_4OH$ | 1.0 | 1.0 |
| PVC | 55.0 | 55.0 |
| Wt./gal | 11.1 | 11.1 |
| Fluorochemical modifier: |  |  |
| Fluorochemical salt of Example 31 | 0 | 7.8 |
| Fluorochemical salt of solids, percent by weight of total solids | 0 | 0.6 |
| Viscosity, kreb units | 93 | 85 |
| Oleophobic value | <1 | 3 |

Scrub test (Dried 4 days before testing cycles to remove stain agent)

| Cycles | 54 |
|---|---|
| Lipstick | +2,000 | 1,880 |
| Lead pencil | 35 | 27 |
| China marker | 860 | 980 |
| Ballpoint pen | 1,760 | 1,780 |
| Olive oil [1] | 900 | 16 |
| Merthiolate | 420 | 456 |
| Sheen buildup |  | θ |
| Visual examination of stain removal against control: |  |  |
| Lipstick |  | + |
| Ballpoint |  | = |
| Olive oil |  | + |

[1] The surface oil disappears during the scrub cycles but resurfaces after standing over night.

EXAMPLES 55-57

Salts of fluorochemical compositions in flat latex interior paint

|  | Control | 55 | 56 | 57 |
|---|---|---|---|---|
| Paint formulation, parts by weight: |  |  |  |  |
| Water | 78.1 | 78.1 | 78.1 | 78.1 |
| Dispersing agent | 6.0 | 6.0 | 6.0 | 6.0 |
| Wetting agent | 1.2 | 1.2 | 1.2 | 1.2 |
| Cellulosic thickener | 163.5 | 163.5 | 163.5 | 163.5 |
| Anti-foam agent | 1.8 | 1.8 | 1.8 | 1.8 |
| Coalescing agent | 18.0 | 18.0 | 18.0 | 18.0 |
| Wet edge agent | 9.0 | 9.0 | 9.0 | 9.0 |
| Anti-mildew fungicide | 0.6 | 0.6 | 0.6 | 0.6 |
| $TiO_2$ | 108.0 | 108.0 | 108.0 | 108.0 |
| Natural silica | 31.5 | 31.5 | 31.5 | 31.5 |
| Calcined clay | 78.0 | 78.0 | 78.0 | 78.0 |
| Synthetic $SiO_2$ | 16.2 | 16.2 | 16.2 | 16.2 |
| 100% acrylic resin | 155.0 | 155.0 | 155.0 | 155.0 |
| $NH_4OH$ | 1.0 | 1.0 | 1.0 | 1.0 |
| Fluorochemical modifiers: |  |  |  |  |
| Fluorochemical salt of Example 46, parts by weight of solids |  | 3.5 |  |  |
| Fluorochemical salt of Example 38, parts by weight of solids |  |  | 4.7 |  |
| Fluorochemical salt of example 42, parts by weight of solids |  |  |  | 4.2 |
| Fluorochemical salts solids, percent on total solids | 0 | 0.4 | 0.4 | 0.4 |
| Viscosity, kreb units | 92 | 96.5 | 89 | 86 |
| Oleophic value | <1 | 1 | 5 | 5 |

Scrub test (No. of cycles to remove stain agent)

| Cycles | 55 | 56 | 57 |
|---|---|---|---|
| Lipstick | +2,000 | +2,000 | +2,000 | +2,000 |
| Lead pencil | 31 | 60 | 22 | 22 |
| China marking pencil | 158 | 420 | 166 | 323 |
| Ballpoint pen | 1,500 | 1,765 | +2,000 | 1,585 |
| Olive oil (apparent) | 7 | 80 | 5 | 56 |
| Merthiolate | 340 | 450 | +2,000 | 770 |
| Sheen rating visual | ([1]) | ([1]) | ([1]) | ([1]) |
| Visual rating of stain removal rated against control: |  |  |  |  |
| Lipstick |  | = | θ | + |
| Ballpoint pen |  | + | = | + |
| Olive oil [2] |  | + | + | + |
| Methiolate |  | = | θ | = |

[1] All equal.
[2] The olive oil penetrated and its stain required a visual rating after drying because it reappeared.

EXAMPLES 58-61

Salts of fluorochemical compositions in flat latex interior paint

|  | Control | 58 | 59 | 60 | 61 |
|---|---|---|---|---|---|
| Paint formulation, parts by weight: |  |  |  |  |  |
| Water | 78.1 | 78.1 | 78.1 | 78.1 | 78.1 |
| Dispersing agent | 6.0 | 6.0 | 6.0 | 6.0 | 6.0 |
| Wetting agent | 1.2 | 1.2 | 1.2 | 1.2 | 1.2 |
| Cellulosic thickener | 163.5 | 163.5 | 163.5 | 163.5 | 163.5 |
| Anti-foam agent | 1.8 | 1.8 | 1.8 | 1.8 | 1.8 |
| Coalescing agent | 18.0 | 18.0 | 18.0 | 18.0 | 18.0 |
| Wet edge agent | 9.0 | 9.0 | 9.0 | 9.0 | 9.0 |
| Anti-mildew fungicide | 0.6 | 0.6 | 0.6 | 0.6 | 0.6 |
| $TiO_2$ | 108.0 | 108.0 | 108.0 | 108.0 | 108.0 |
| Natural silica | 31.5 | 31.5 | 31.5 | 31.5 | 31.5 |
| Calcined clay | 78.0 | 78.0 | 78.0 | 78.0 | 78.0 |
| Synthetic $SiO_2$ | 16.2 | 16.2 | 16.2 | 16.2 | 16.2 |
| 100% acrylic resin | 155.0 | 155.0 | 155.0 | 155.0 | 155.0 |
| $NH_4OH$ | 1.0 | 1.0 | 1.0 | 1.0 | 1.0 |
| Fluorochemical modifiers: |  |  |  |  |  |
| Fluorochemical salt of Example 42, parts by weight of solids |  | 3.0 |  |  |  |
| Fluorochemical salt of Example 43, parts by weight of solids |  |  | 3.1 |  |  |
| Fluorochemical salt of Example 44, parts by weight of solids |  |  |  | 3.1 |  |
| Fluorochemical salt of Example 45, parts by weight of solids |  |  |  |  | 3.1 |
| Fluorochemical salts solids, percent on total solids | 0 | .3 | .3 | .3 | .3 |
| Viscosity, kreb units | 110 | 110 | 107 | 106 | 109 |
| Oleophobic value | <1 | 2 | 5 | 5 | 4 |

Scrub test (No. of cycles to remove stain agent)

| Cycles | 58 | 59 | 60 | 61 |
|---|---|---|---|---|
| Lipstick | +2,000 | +2,000 | +2,000 | +2,000 | +2,000 |
| Lead pencil | 800 | 600 | 500 | 480 | 700 |
| China marking pencil | 550 | 415 | 510 | 530 | 485 |
| Ballpoint pen | +2,000 | +2,000 | +2,000 | +2,000 | +2,000 |
| Olive oil (apparent) [1] | +2,000 | +2,000 | +2,000 | +2,000 | +2,000 |
| Merthiolate | +2,000 | +2,000 | +2,000 | +2,000 | +2,000 |
| Sheen rating visual | ([2]) | ([2]) | ([2]) | ([2]) | ([2]) |
| Visual rating of stain removal rated against control: |  |  |  |  |  |
| Lipstick |  | + | + | θ | = |
| Ballpoint pen |  | = | + | + | θ |
| Olive oil [1] |  | ++ | ++ | ++ | ++ |
| Merthiolate |  | + | + | + | + |

[1] The olive oil penetrated and its stain required a visual rating after drying because it reappeared.
[2] All equal.

EXAMPLE 62

Following the procedures of Example 4, a copolymer of perfluorocyclohexaneacrylate - 2 - ethylhexylacrylate-methacrylic acid was prepared using the following ingredients:

|  | G. |
|---|---|
| Undecafluorocyclohexaneacrylate | 40 |
| 2-Ethylhexylacrylate | 5 |
| Methacrylic acid | 5 |
| Water | 125 |
| Sodium Lauryl Sulfate (28%) | 5 |
| $(NH_4)_2S_2O_8$ | 0.25 |
| $NaHSO_3$ | 0.25 |

The copolymer total solids recovered was 26.5 g. On the basis of the solids in the fluorochemical compounds, 1.0 weight percent was added to the control paint composition of Example 48 with the following results:

|  | Control | Example 62 Product |
|---|---|---|
| Oleophobic value | <1 | 3 |
| Stain removal: |  |  |
| Olive oil | 5 | 8 |
| Ink | 2 | 5 |
| Lemon juice | 2 | 5 |
| Motor oil | 10 | 9 |
| Chlorox | 2 | 4 |

EXAMPLES 63 AND 64
Fluorochemical compositions in exterior latex paint

|  | Control | 63 | 64 |
|---|---|---|---|
| Paint composition (parts by weight): |  |  |  |
| Water | 99.0 | 99.0 | 99.0 |
| Cellulosic thickener (2% solution) | 156.0 | 156.0 | 156.0 |
| Wetting agent | 2.5 | 2.5 | 2.5 |
| Anti-foam agent | 1.8 | 1.8 | 1.8 |
| Wet edge agent | 15.0 | 15.0 | 15.0 |
| Coalescing agent | 4.2 | 4.2 | 4.2 |
| Fungicide | 3.0 | 3.0 | 3.0 |
| $TiO_2$ | 135.0 | 135.0 | 135.0 |
| Talc | 60.0 | 60.0 | 60.0 |
| $TiO_2$, chalking | 15.0 | 15.0 | 15.0 |
| Ethylene-vinylacetate emulsion resin | 180.0 | 180.0 | 180.0 |
| Dispersing agent | 5.0 | 3.0 | 3.4 |
| Fluorochemical modifier: |  |  |  |
| Fluorochemical salt of Example 31 |  | 8.1 | 5.4 |
| Fluorochemical salt, percent by weight of total solids |  | 0.6 | 0.4 |
| Oleophobic rating | <1 | 2 | 1 |
| Shake and rinse rating | 4 | 9 | 8 |

EXAMPLES 65-67
Salts of fluorochemical compositions in exterior acrylic latex paint

|  | Control | 65 | 66 | 67 |
|---|---|---|---|---|
| Paint formulation (parts by weight): |  |  |  |  |
| Water | 50.2 | 50.2 | 50.2 | 50.2 |
| Dispersing agent | 7.6 | 7.6 | 7.6 | 7.6 |
| Wetting agent | 1.5 | 1.5 | 1.5 | 1.5 |
| Anti-foam agent | 1.2 | 1.2 | 1.2 | 1.2 |
| Wet Edge agent | 15.0 | 15.0 | 15.0 | 15.0 |
| Fungicide | 0.6 | 0.6 | 0.6 | 0.6 |
| Cellulosic thickener | 57.0 | 57.0 | 57.0 | 57.0 |
| $TiO_2$ | 150.0 | 150.0 | 150.0 | 150.0 |
| Talc | 123.5 | 123.5 | 123.5 | 123.5 |
| 100% acrylic resin | 299.1 | 299.1 | 299.1 | 299.1 |
| Coalescing agent | 4.2 | 4.2 | 4.2 | 4.2 |
| $NH_4OH$ | 1.2 | 1.2 | 1.2 | 1.2 |
| Fluorochemical modifiers: |  |  |  |  |
| Fluorochemical salt of Ex. 46 |  | 5.3 |  |  |
| Fluorochemical salt of Ex. 38 |  |  | 8.0 |  |
| Fluorochemical salt of Example 42 |  |  |  | 6.9 |
| Fluorochemical salt, percent total solids |  | 0.5 | 0.5 | 0.5 |
| Oleophobic value | <1 | 1 | 5 | 6 |
| Viscosity, kreb units |  | 90 | 84 | 84 | 86 |
| Shake and rinse test | 4 | 6 | 7 | 8 |

We claim:

1. A water soluble polymeric composition consisting essentially of (1) solid copolymers consisting essentially of (a) a fluorocarbon acrylic monomer of addition polymerized units from the structure:

$$R_fLZ$$

wherein $R_f$ is $R_2(CF_2)a-$, where $R_2$ is F or H and $a$ is an integer of from 1 to 20,

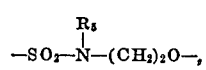

where $R_3$ is F or H when $b$ is 0 and $R_3$ is F when $b$ is an integer of from 1 to 18 or $R_4(c-C_6F_{10})-$, where $R_4$ is F or $C_nF_{2n+1}$ and $n$ is an integer of from 1 to 4 and where $c-$ designates an alicyclic structure;

L is:

where $R_5$ is an alkyl group having from 1 to 10 carbon atoms, $-(CH_2)_nO-$, where $n$ is a number from 0 to 2 or

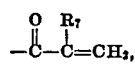

where $R_6$ is an alkyl group having from 1 to 10 carbon atoms;

Z is:

$$-\overset{O}{\overset{\|}{C}}-\overset{R_7}{\overset{|}{C}}=CH_2,$$

where $R_7$ is H or $CH_3$, and (b) an α,β-ethylenically unsaturated monocarboxylic acid, the ratio of fluorocarbon acrylic monomer to the carboxylic acid being in the range from about 99:1 by weight to about 50:50 by weight, and (2) a nitrogen-containing salt forming agent from 0.5 to about 1.25 times the stoichiometric amount required to neutralize the acid portion of the polymer selected from the group consisting of primary, secondary and tertiary amines.

2. The composition of Claim 1 wherein the nitrogen-containing salt forming agent is ethylamine, diethylamine, triethylamine, triethanolamine, triethylenediamine, diisobutylamine, ethylimidazole, imidazole or morpholine.

3. The composition of Claim 2 wherein the fluorocarbon acrylic monomer is undecafluorocyclohexane carbinol acrylate and the carboxylic acid is methacrylic acid.

4. The composition of Claim 2 wherein the fluorocarbon acrylic monomer is undecafluorocyclohexane carbinol methacrylate and the carboxylic acid is methacrylic acid.

5. The composition of Claim 2 wherein the fluorocarbon acrylic monomer is pentadecafluoro (n-heptyl) carbinol acrylate and the carboxylic acid is methacrylic acid.

6. The composition of Claim 2 wherein the fluorocarbon acrylic monomer is 5-hydrooctafluoro (n-butyl) carbinol methacrylate and the carboxylic acid is methacrylic acid.

7. The composition of Claim 2 wherein the fluorocarbon acrylic monomer is pentadecafluoroheptyl-N-ethyl-sulfonamido ethyl acrylate and the carboxylic acid is methacrylic acid.

8. The composition of Claim 2 wherein the fluorocarbon acrylic monomer is undecafluorocyclohexane-(N-t-butyl)- carbonamido-N-(2-ethyl-) acrylate and the carboxylic acid is acrylic acid.

9. The composition of Claim 2 wherein the fluorocarbon acrylic monomer is 1,1,2,2-tetrahydroheptadecafluoro decyl methacrylate and the carboxylic acid is acrylic acid.

10. The composition of Claim 2 wherein the fluorocarbon acrylic monomer is a mixture of heptafluoro (n-propyl) carbinol acrylate and undecafluorocyclohexane carbinol acrylate and the carboxylic acid is methacrylic acid.

11. The composition of Claim 2 wherein the fluorocarbon acrylic monomer is perfluoro-4-(n-butyl) cyclohexane carbinol acrylate and the carboxylic acid is methacrylic acid.

References Cited
UNITED STATES PATENTS

| | | | |
|---|---|---|---|
| 3,182,047 | 5/1965 | Wehrmeister et al. | 260—86.1 N |
| 3,198,770 | 8/1965 | Watkins | 260—86.1 N |
| 3,372,149 | 3/1968 | Fertig et al. | 260—86.1 N |

OTHER REFERENCES

Meares: Polymers: Structure and Bulk Properties; 1967; p. 13.

HAROLD D. ANDERSON, Primary Examiner

U.S. Cl. X.R.

117—132 CF, 148, 161 UG; 260—17.4 CL, 29.6 F, 29.6 RW, 29.6 MN, 78.5 BB, 78.5 T, 80.81, 86 IN